US011788725B2

(12) United States Patent
Duncan et al.

(10) Patent No.: US 11,788,725 B2
(45) Date of Patent: Oct. 17, 2023

(54) TRAPPED VORTEX COMBUSTOR FOR A GAS TURBINE ENGINE WITH A DRIVER AIRFLOW CHANNEL

(71) Applicant: General Electric Company, Schenectady, NY (US)

(72) Inventors: Beverly Stephenson Duncan, West Chester, OH (US); Steven Joseph Lohmueller, Reading, OH (US); Eric John Stevens, Mason, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/542,900

(22) Filed: Dec. 6, 2021

(65) Prior Publication Data

US 2022/0090788 A1    Mar. 24, 2022

Related U.S. Application Data

(62) Division of application No. 15/584,057, filed on May 2, 2017, now Pat. No. 11,262,073.

(51) Int. Cl.
*F23R 3/06* (2006.01)
*F23R 3/00* (2006.01)
*F23R 3/60* (2006.01)
*F23R 3/58* (2006.01)
*F23R 3/50* (2006.01)
(Continued)

(52) U.S. Cl.
CPC ............... *F23R 3/06* (2013.01); *F23R 3/002* (2013.01); *F23R 3/12* (2013.01); *F23R 3/60* (2013.01); *F23R 3/10* (2013.01); *F23R 3/286* (2013.01); *F23R 3/30* (2013.01); *F23R 3/50* (2013.01); *F23R 3/58* (2013.01); *F23R 2900/00015* (2013.01); *F23R 2900/03041* (2013.01)

(58) Field of Classification Search
CPC .. F23R 2900/00015; F23R 2900/00017; F23R 3/60; F23R 2900/03041–03045; F23R 3/04; F23R 3/58; F05D 2230/51–52; F05D 2230/64–644; F05D 2240/90
See application file for complete search history.

(56) References Cited

U.S. PATENT DOCUMENTS

3,906,718 A   9/1975   Wood
5,619,855 A   4/1997   Burrus
(Continued)

*Primary Examiner* — Stephanie Sebasco Cheng
(74) *Attorney, Agent, or Firm* — Venable LLP; Edward A. Kmett; Michele V. Frank (57) ABSTRACT

A trapped vortex combustor for use in a gas turbine engine includes an outer vortex chamber wall and a dome attached to, or formed integrally with, the outer vortex chamber wall. The dome, the outer vortex chamber wall, or both define at least in part an outer trapped vortex chamber and a channel. The channel extends along the circumferential direction at a forward end of the outer vortex chamber wall, the channel configured to receive an airflow through or around the outer vortex chamber wall, the dome, or both and provide such airflow as a continuous annular airflow to the inner surface of the outer vortex chamber wall. The dome further defines a fuel nozzle opening, with all openings in the dome outward of the fuel nozzle opening along the radial direction, excepting any effusion cooling holes having a diameter less than about 0.035 inches, being in airflow communication with the channel.

15 Claims, 8 Drawing Sheets

(51) Int. Cl.
    *F23R 3/10*     (2006.01)
    *F23R 3/12*     (2006.01)
    *F23R 3/28*     (2006.01)
    *F23R 3/30*     (2006.01)

(56) References Cited

U.S. PATENT DOCUMENTS

| | | |
|---|---|---|
| 5,968,378 A | 10/1999 | Jensen |
| 6,286,298 B1 | 9/2001 | Burrus et al. |
| 6,286,317 B1 * | 9/2001 | Burrus ............... F23R 3/06 60/750 |
| 6,334,298 B1 * | 1/2002 | Aicholtz ............. F23R 3/58 60/750 |
| 6,540,162 B1 | 4/2003 | Johnson et al. |
| 6,732,527 B2 | 5/2004 | Freeman et al. |
| 6,735,949 B1 | 5/2004 | Haynes et al. |
| 6,820,424 B2 | 11/2004 | Oechsle et al. |
| 6,959,550 B2 | 11/2005 | Freeman et al. |
| 7,770,397 B2 | 8/2010 | Patel et al. |
| 8,272,219 B1 | 9/2012 | Johnson et al. |
| 8,322,142 B2 | 12/2012 | Armstrong et al. |
| 8,459,042 B2 | 6/2013 | Lohmueller |
| 9,068,751 B2 | 6/2015 | Snyder |
| 9,074,773 B2 * | 7/2015 | Boardman ............ F23R 3/286 |
| 10,520,197 B2 * | 12/2019 | Dziech ............... F23R 3/002 |
| 11,262,073 B2 * | 3/2022 | Duncan ............... F23R 3/346 |
| 11,339,966 B2 * | 5/2022 | Bilse ................. F23R 3/10 |
| 2005/0034458 A1 | 2/2005 | Burrus et al. |
| 2008/0104962 A1 | 5/2008 | Patel et al. |
| 2008/0271703 A1 | 11/2008 | Armstrong et al. |
| 2011/0061395 A1 | 3/2011 | Kendrick |
| 2019/0203611 A1 * | 7/2019 | Stieg ................. F23R 3/60 |
| 2019/0203940 A1 * | 7/2019 | Stieg ................. F23R 3/60 |

\* cited by examiner

TRAPPED VORTEX COMBUSTOR FOR A GAS TURBINE ENGINE WITH A DRIVER AIRFLOW CHANNEL

CROSS-REFERENCE TO RELATED APPLICATIONS

This application is a divisional of U.S. patent application Ser. No. 15/584,057 filed on May 2, 2017, the contents of which are hereby incorporated by reference in their entirety.

FEDERALLY SPONSORED RESEARCH

This invention was made with government support under contract number N00421-02-C-3202 with the United States Naval Air System Command. The government may have certain rights in the invention.

FIELD

The present disclosure relates generally to gas turbine engines and, more specifically, to a trapped vortex combustor assembly for use in gas turbine engines.

BACKGROUND

Gas turbine engine are often used to generate thrust for aircraft. Gas turbine engine have a gas path that typically includes, in serial-flow order, an air intake, a compressor section, a combustor, a turbine section, and a gas outlet. Compressor and turbine sections include at least one row of circumferentially-spaced rotating blades coupled within a housing. The compressor section generally provides compressed air to the combustor, where the compressed air is mixed with fuel and combusted to generate combustion gases. The combustion gases flow through the turbine section to power the turbine section. The turbine section may, in turn, power the compressor section and optionally a propulsor, such as a fan or propeller.

Advanced aircraft gas turbine engine technology requirements are driving the combustors therein to be shorter in length, have higher performance levels over wider operating ranges, and produce lower exhaust pollutant emission levels. Trapped vortex combustors have been developed in an attempt to achieve these goals. As used herein, the term "trapped vortex combustor" generally refers to a combustor having one or more sections (e.g., inner and/or outer trapped vortex chambers) upstream of a combustion chamber configured to at least partially pre-mix and pre-vaporize a fuel in a swirling vortex of pressurized air. Accordingly, it will be appreciated that with trapped vortex combustors, fuel injectors are typically disposed axially upstream from the combustion chamber so that the fuel and air has sufficient time to mix and pre-vaporize. In this way, the pre-mixed and pre-vaporized fuel and air mixture may support cleaner combustion thereof in the combustion chamber for reducing exhaust emissions.

However, it is desirable to provide increased pre-mixing and pre-vaporization prior to such mixture reaching the combustion chamber. Accordingly, a trapped vortex combustor capable of providing increased pre-mixing and/or pre-vaporization would be useful.

BRIEF DESCRIPTION

Aspects and advantages of the invention will be set forth in part in the following description, or may be obvious from the description, or may be learned through practice of the invention.

In one embodiment of the present disclosure, a trapped vortex combustor for use in a gas turbine engine is provided. The trapped vortex combustor defines a radial direction and a circumferential direction. The trapped vortex combustor includes an outer vortex chamber wall defining a forward end and including an inner surface. The trapped vortex combustor additionally includes a dome attached to, or formed integrally with, the outer vortex chamber wall. The dome, the outer vortex chamber wall, or both define at least in part an outer trapped vortex chamber and a channel. The channel extends along the circumferential direction at the forward end of the outer vortex chamber wall, the channel configured to receive an airflow through or around the outer vortex chamber wall, the dome, or both and provide such airflow as a continuous annular airflow to the inner surface of the outer vortex chamber wall. The dome further defines a fuel nozzle opening, with all openings in the dome outward of the fuel nozzle opening along the radial direction, excepting any effusion cooling holes having a diameter less than about 0.035 inches, being in airflow communication with the channel.

In certain exemplary embodiments the combustor further includes an inner combustion chamber liner and an outer combustion chamber liner together defining a combustion chamber, wherein the outer vortex chamber is positioned upstream of the combustion chamber.

In certain exemplary embodiments the dome, the outer vortex chamber wall, or both define a plurality of openings in airflow communication with the channel for providing the airflow to the channel. For example, in certain exemplary embodiments both the dome and the outer vortex chamber wall define the plurality of openings. Additionally, for example, in certain exemplary embodiments the plurality of openings are spaced along the circumferential direction.

In certain exemplary embodiments the outer vortex chamber is configured to receive a total amount of airflow during operation, and wherein at least about fifteen percent of the total amount of airflow is provided through the channel.

In certain exemplary embodiments the channel extends substantially continuously three hundred and sixty degrees about an axial centerline of the trapped vortex combustor.

In certain exemplary embodiments the dome includes a lip extending into the outer vortex chamber, wherein the lip defines the channel with the inner surface of the outer vortex chamber wall.

In certain exemplary embodiments, the trapped vortex combustor further includes a mount, wherein the dome includes a dome flange, wherein the outer vortex chamber wall includes a wall flange, wherein the mount attaches the dome flange to the wall flange, wherein the channel is defined between the dome flange and the wall flange, and wherein at least one of the mount, the dome flange, or the wall flange defines a plurality of openings in airflow communication with the channel for providing the airflow to the channel.

In certain exemplary embodiments the channel is an outer channel, and wherein the combustor further an inner vortex chamber wall defining a forward end and includes an inner surface, wherein the dome is attached to, or formed integrally with, the inner vortex chamber wall, wherein the dome, the inner vortex chamber wall, or both define at least in part an inner trapped vortex chamber and an inner channel, the inner channel extending along the circumferential direction at the forward end of the inner vortex chamber wall, the inner channel configured to receive an airflow through or around the inner vortex chamber wall, the dome, or both and provide such airflow as a continuous annular airflow to the inner surface of the inner vortex chamber wall. For example, in certain exemplary embodiments the fuel nozzle opening of the dome is an outer fuel nozzle opening, wherein the dome further defines an inner fuel nozzle opening, and wherein all openings in the dome inward of the inner fuel nozzle opening along the radial direction, excepting any effusion cooling holes having a diameter less than about 0.035 inches, are in airflow communication with the inner channel. Additionally, for example, in certain exemplary embodiments the inner channel extends substantially continuously three hundred and sixty degrees about an axial centerline of the trapped vortex combustor.

In certain exemplary embodiments the channel is an outer channel defining an outlet, wherein the trapped vortex combustor further includes an inner vortex chamber wall defining a forward end, wherein the dome, the inner vortex chamber wall, or both define at least in part an inner channel at the forward end, wherein the inner channel defines an outlet, wherein the trapped vortex combustor defines a cavity height between the outer vortex chamber wall at the outlet of the outer channel and the inner vortex chamber wall at the outlet of the inner channel, wherein the outer channel further defines a maximum height, and wherein the maximum height of the outer channel is between about 0.1 percent and about eight percent of the cavity height.

In certain exemplary embodiments the channel is an outer channel defining an outlet, wherein the trapped vortex combustor further includes an inner vortex chamber wall defining a forward end, wherein the dome, the inner vortex chamber wall, or both define at least in part an inner channel at the forward end, wherein the inner channel defines an outlet, wherein the trapped vortex combustor defines a cavity height between the outer vortex chamber wall at the outlet of the outer channel and the inner vortex chamber wall at the outlet of the inner channel, wherein the fuel nozzle opening defines a separation from the inner surface of the outer vortex chamber wall, and wherein the separation is between about one percent and about eight percent of the cavity height.

In another exemplary embodiment of the present disclosure, a trapped vortex combustor for a gas turbine engine is provided. The trapped vortex combustor defines a radial direction and a circumferential direction. The trapped vortex combustor includes an outer vortex chamber wall defining a forward end and including an inner surface. The trapped vortex combustor additionally includes a dome attached to, or formed integrally with, the outer vortex chamber wall, the dome, the outer vortex chamber wall, or both defining at least in part an outer trapped vortex chamber and a channel, the channel extending along the circumferential direction at the forward end of the outer vortex chamber wall, the channel configured to receive an airflow through or around the outer vortex chamber wall, the dome, or both and provide such airflow as a continuous annular airflow to the inner surface of the outer vortex chamber wall, wherein the outer vortex chamber is configured to receive a total amount of airflow during operation, and wherein at least about fifteen percent of the total amount of airflow is provided through the channel.

In an exemplary aspect of the present disclosure, a method is provided for operating a trapped vortex combustor of a gas turbine engine. The trapped vortex combustor includes an outer vortex chamber wall and a dome attached to, or formed integrally with, the outer vortex chamber wall. The dome, the outer vortex chamber wall, or both defines at least in part an outer trapped vortex chamber and a channel, the channel positioned at a forward end of the outer vortex chamber wall. The method includes providing an airflow through or around the dome, the outer vortex chamber wall, or both to the channel, and providing the airflow received in the channel to the outer vortex chamber as an annular airflow, the annual airflow being at least about fifteen percent of a total amount of airflow provided to the outer vortex chamber.

For example, in certain exemplary aspects the annual airflow is between about twenty percent and about forty percent of the total amount of airflow provided to the outer vortex chamber.

For example, in certain exemplary aspects providing the airflow through or around the dome, the outer vortex chamber wall, or both to the channel includes providing the airflow through a plurality of airflow openings defined by the dome, the outer vortex chamber wall, or both.

For example, in certain exemplary aspects providing the airflow received in the channel to the outer vortex chamber as an annual airflow includes providing the airflow received in the channel to the outer vortex chamber as an annular airflow along an inner surface of the outer vortex chamber wall.

For example, in certain exemplary aspects the channel is an outer channel, wherein the combustor further includes an inner vortex chamber wall, wherein the dome is attached to, or formed integrally with, the inner vortex chamber wall, wherein the dome, the inner vortex chamber wall, or both define at least in part an inner trapped vortex chamber and an inner channel positioned at a forward end of the inner vortex chamber wall. With such an exemplary aspect, the method further includes providing an airflow through or around the dome, the inner vortex chamber wall, or both to the inner channel, and providing the airflow received in the inner channel to the inner vortex chamber as an annual airflow, the annual airflow being at least about fifteen percent of a total amount of airflow provided to the inner vortex chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
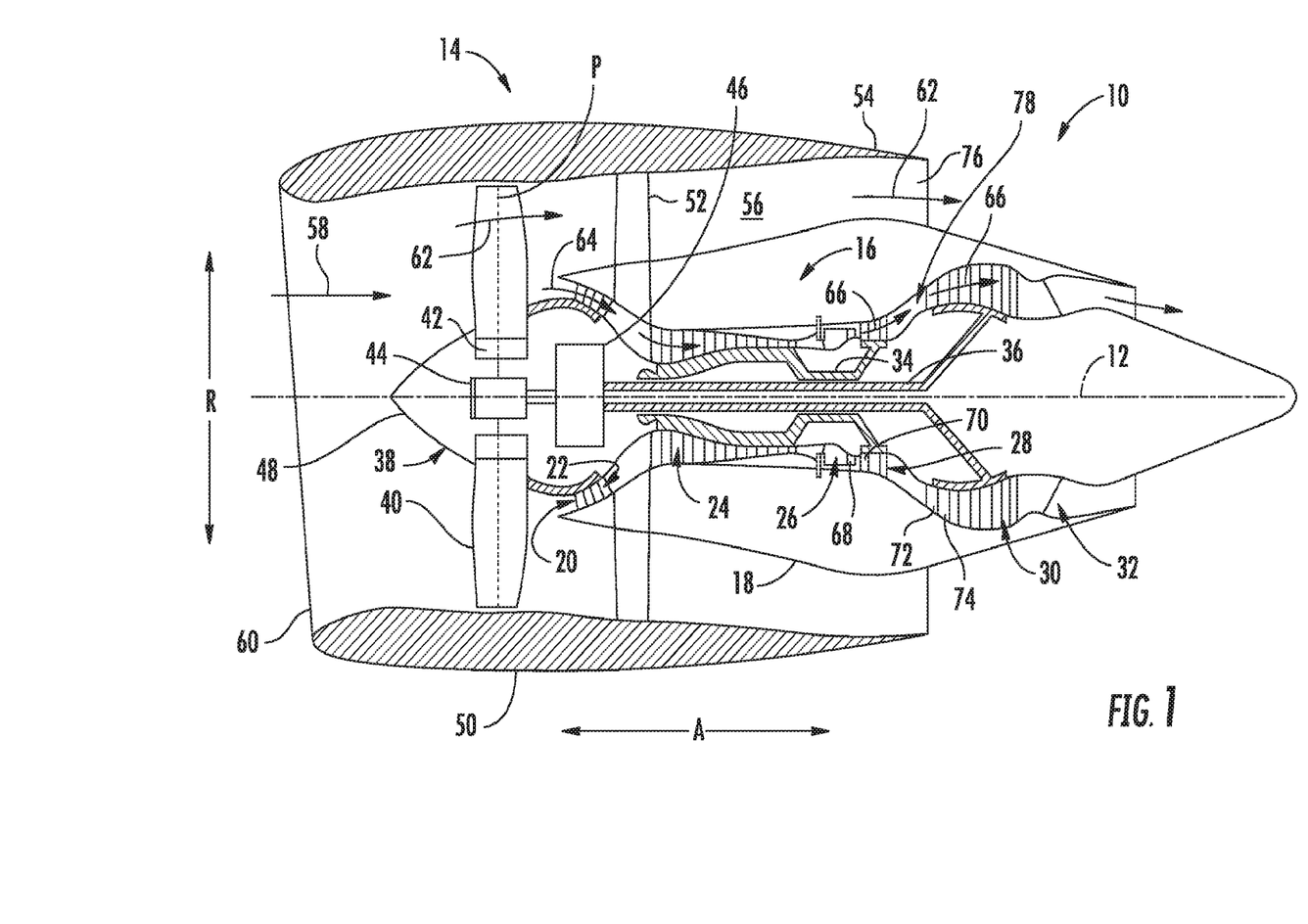
FIG. 1 is a schematic, cross-sectional view of a gas turbine engine in accordance with an exemplary embodiment of the present disclosure.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66. Notably, as will be described in greater detail, below, the combustion section 26 includes a trapped vortex combustor for mixing the compressed air with fuel and generating combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbofan engine 10 may instead be configured as, e.g., a direct-drive turbofan engine, a fixed-pitch turbofan engine, etc. Additionally, or alternatively, the turbofan engine 10 may be configured as a turboprop engine, a turbojet engine, a turboshaft engine, a ramjet engine, an auxiliary power unit engine, etc. Additionally, or alternatively, still, in other embodiments the turbofan engine 10 of FIG. 1 may instead be configured as an aeroderivative gas turbine engine, e.g., for nautical uses, or as an industrial gas turbine engine, e.g., for power generation.

Figure 2:
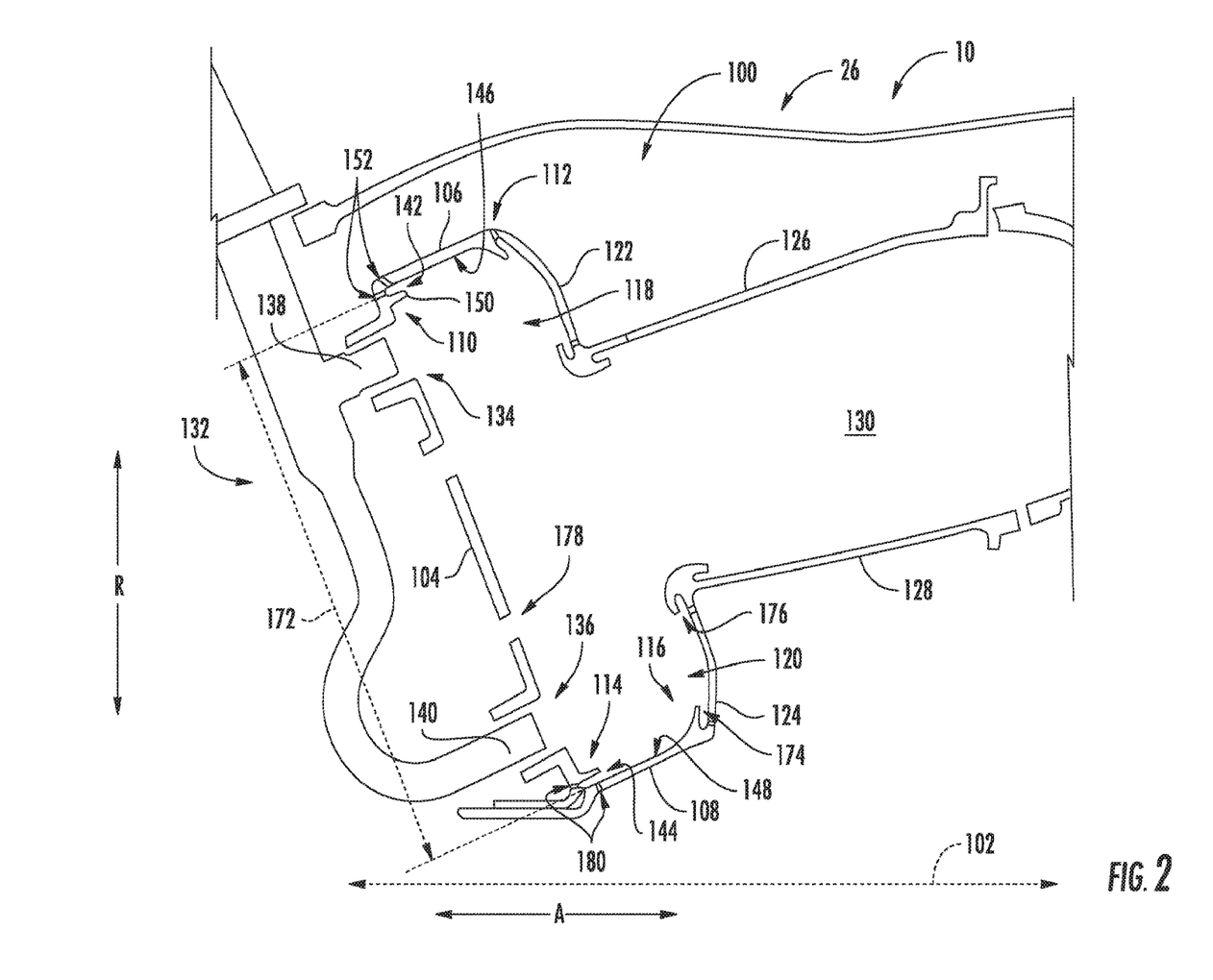
FIG. 2 is a side, schematic, cross-sectional view of a combustor assembly in accordance with an exemplary embodiment of the present disclosure.

Referring now to FIG. 2, a close-up, cross-sectional view of a combustion section 26 of a gas turbine engine in accordance with an exemplary embodiment of the present disclosure is provided. The combustion section 26 depicted in FIG. 2 may, in certain exemplary embodiments, be the exemplary combustion section 26 described above with reference to FIG. 1. However, in other exemplary embodiments, the combustion section 26 of FIG. 2 may be incorporated into any other suitable gas turbine engine, such as any suitable turboprop engine, turbojet engine, turboshaft engine, ramjet engine, auxiliary power unit engine, aeroderivative gas turbine engine, industrial gas turbine engine, etc.

Figure 3:
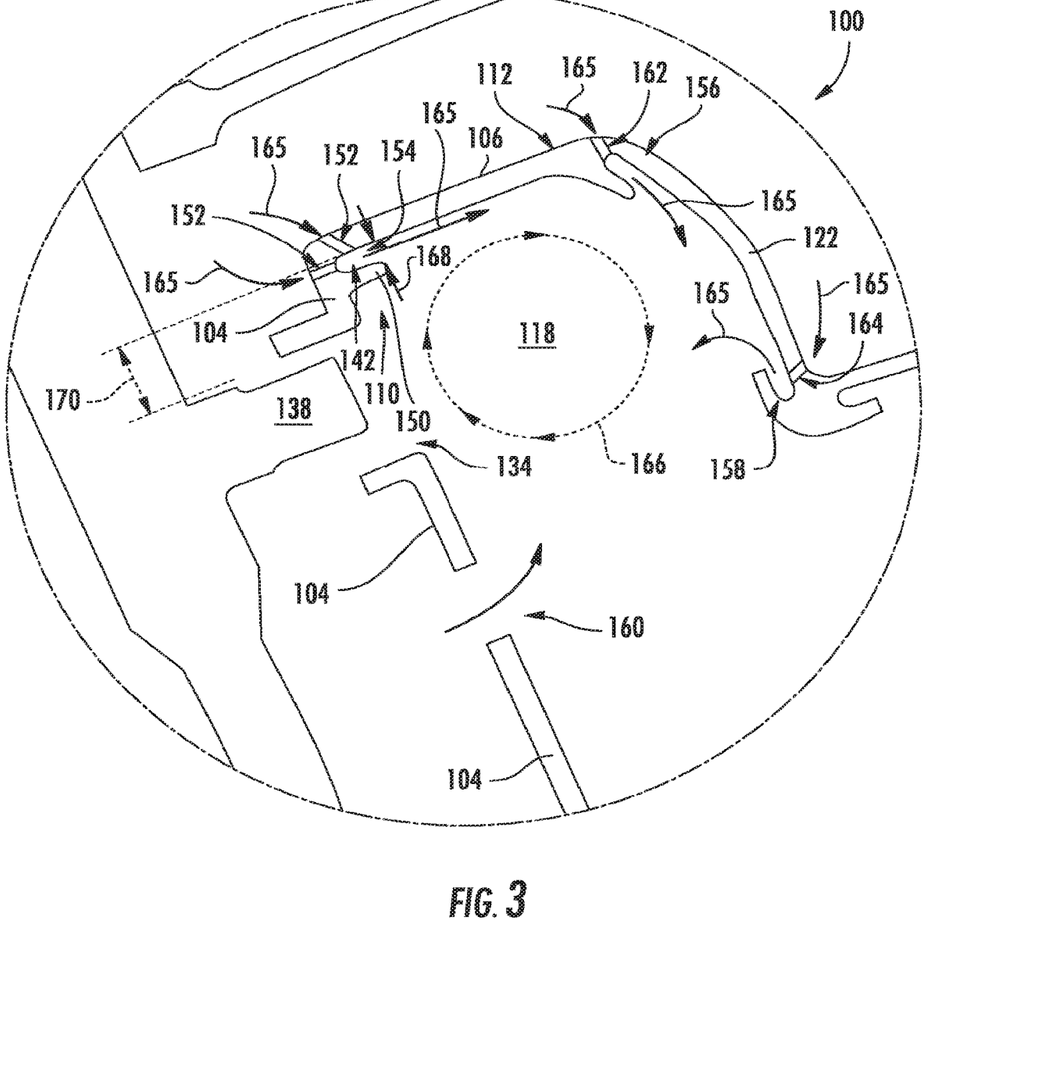
FIG. 3 is a side, schematic, cross-sectional view of a combustor assembly in accordance with an exemplary embodiment of the present disclosure.
Figure 5:
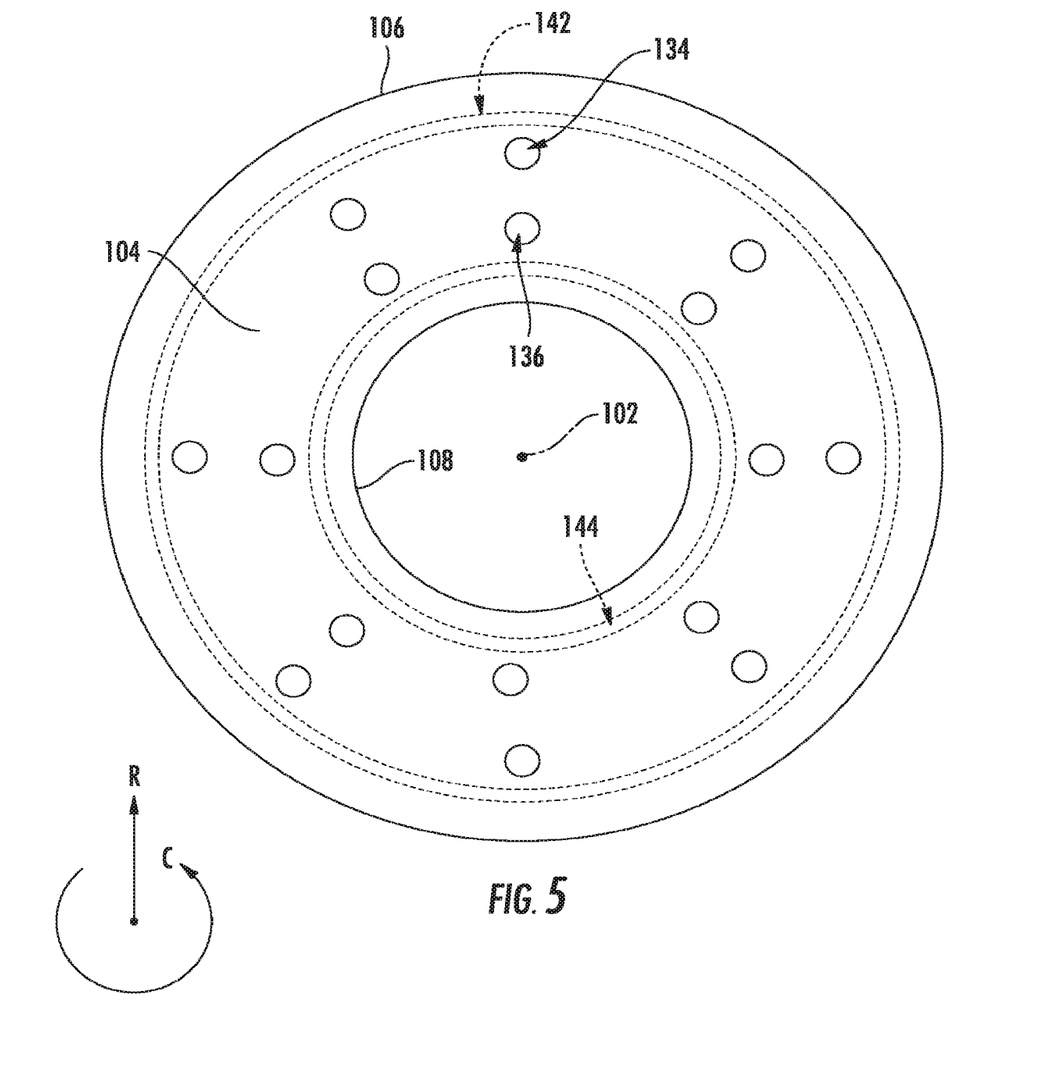
FIG. 5 is a simplified, schematic view of a forward end of the exemplary combustor assembly of FIG. 2.

As will be appreciated, the combustion section 26 generally includes a combustor 100, with the combustor 100 defining an axial direction A (and an axial centerline 102; see FIG. 5), a radial direction R, and a circumferential direction C (i.e., a direction extending about the axial direction A; see FIG. 3). Notably, in certain exemplary embodiments, the axial direction A, radial direction R, and circumferential direction C defined by the combustor 100 may align with the axial direction A, radial direction R, and circumferential direction C defined by the gas turbine engine within which it is installed (see FIG. 1), and further, the axial centerline 102 may align with the longitudinal centerline 12 of the gas turbine engine within which it is installed (see FIG. 1).

The exemplary combustor 100 depicted in FIG. 2 is generally configured as, and referred to herein as, a trapped vortex combustor 100. The trapped vortex combustor 100 generally includes a dome 104, an outer vortex chamber wall 106, and an inner vortex chamber wall 108. The outer vortex chamber wall 106 extends between and defines a forward end 110 and an aft end 112, and similarly, the inner vortex chamber wall 108 extends between and defines a forward end 114 and an aft end 116. The dome 104 is attached to, or formed integrally with, the outer vortex chamber wall 106 at the forward end 110 of the outer vortex chamber wall 106, and further is attached to or formed integrally with, the inner vortex chamber wall 108 at the forward end 114 of the inner vortex chamber wall 108. The dome 104, the outer vortex chamber wall 106, or both define, at least in part, an outer trapped vortex chamber 118, and further the dome 104, the inner vortex chamber wall 108, or both define at least in part an inner trapped vortex chamber 120.

The trapped vortex combustor 100 further includes an outer transition wall 122 and an inner transition wall 124. The outer transition wall 122 is attached to, or formed integrally with, the outer vortex chamber wall 106 at the aft end 112 of the outer vortex chamber wall 106, and extends generally inwardly along the radial direction R to further define the outer trapped vortex chamber 118. The inner transition wall 124 is similarly attached to, or formed integrally with, the inner vortex chamber wall 108 at the aft end 116 of the inner vortex chamber wall 108, and extends generally outwardly along the radial direction R to further define the inner trapped vortex chamber 120.

Further, the trapped vortex combustor 100 includes an outer combustion chamber liner 126 and an inner combustion chamber liner 128. The outer combustion chamber liner 126 is attached to, or formed integrally with, the outer transition wall 122 and extends generally aft therefrom. Similarly, the inner combustion chamber liner 128 is attached to, or formed integrally with, the inner transition wall 124 and also extends generally aft therefrom. For the embodiment depicted, the inner combustion chamber liner 128 and outer combustion chamber liner 126 together define at least in part a combustion chamber 130. The outer trapped vortex chamber 118 is positioned forward of, and upstream of, the combustion chamber 130, and the inner trapped vortex chamber 120 is similarly positioned forward of, and upstream of, the combustion chamber 130.

Referring still to FIG. 2, the trapped vortex combustor 100 further includes a fuel nozzle assembly 132. The fuel nozzle assembly 132 generally includes a plurality of fuel nozzles configured to provide fuel to the outer trapped vortex chamber 118 and to the inner trapped vortex chamber 120 during operation. Additionally, the dome 104 generally defines a plurality of fuel nozzle openings configured to receive the respective plurality of fuel nozzles of the fuel nozzle assembly 132. More particularly, for the embodiment depicted, the dome 104 defines an outer fuel nozzle opening 134 and an inner fuel nozzle opening 136. The outer fuel nozzle opening 134 is configured to receive a corresponding outer fuel nozzle 138, which is configured to provide fuel to the outer trapped vortex chamber 118. The inner fuel nozzle opening 136 is configured to receive a corresponding inner fuel nozzle 140, which is configured to provide fuel to the inner trapped vortex chamber 120. It will be appreciated that although for the embodiment depicted the inner and outer fuel nozzles 140, 138 are positioned in openings 136, 134, respectively, in the dome 104, in other exemplary aspects of the present disclosure, the fuel nozzles 140, 138 may instead be positioned in openings defined in the inner vortex chamber wall 108 and outer vortex chamber wall 106, respectively, or at any other suitable location.

Moreover, the trapped vortex combustor 100 is configured to provide an airflow to the inner and outer trapped vortex chambers 120, 118 to mix with the fuel provided thereto and to generate combustion gases 66. More particularly, for the embodiment depicted, the dome 104, the outer vortex chamber wall 106, or both define at least in part an outer channel 142 extending along the circumferential direction C at the forward end 110 of the outer vortex chamber wall 106. Additionally, the dome 104, the inner vortex chamber wall 108, or both define at least in part an inner channel 144 similarly extending along the circumferential direction C at the forward end 114 of the inner vortex chamber wall 108. Notably, the outer vortex chamber wall 106 defines an inner surface 146 and the inner vortex chamber wall 108 similarly defines an inner surface 148. The outer channel 142 is configured to receive an airflow through or around the outer vortex chamber wall 106, the dome 104, or both and provide such airflow as a continuous annular airflow to the inner surface 146 of the outer vortex chamber wall 106. Additionally, the inner channel 144 is configured to receive an airflow through or around the inner vortex chamber wall 108, the dome 104, or both and provide such airflow as a continuous annular airflow to the inner surface 148 of the inner vortex chamber wall 108. It will be appreciated, that as used herein, the description "at the forward end" with respect to the location of the outer channel 142 and/or inner channel 144 refers to the channel being defined at least in part within a forward ten percent of the outer vortex chamber wall 106 or inner vortex chamber wall 108, based on an entire length of the respective wall.

Referring still to FIG. 2, and now also to FIG. 3, providing a close-up view of the outer trapped vortex chamber 118, the outer trapped vortex chamber 118 will be described in greater detail. As is depicted, for the embodiment of FIGS. 2 and 3, the dome 104 and the outer vortex chamber wall 106 together define the outer channel 142 at the forward end 110 of the outer vortex chamber wall 106. More specifically, the dome 104 includes a lip 150 extending into the outer trapped vortex chamber 118 in a direction generally perpendicular to a forward wall of the dome 104, with the lip 150 defining the outer channel 142 with the inner surface 146 of the outer vortex chamber wall 106. Notably, however, in other exemplary embodiments, the lip 150 may not be required, and instead a portion of the dome 104 and/or the outer trapped vortex chamber wall 106 may be extended to define the outer channel 142.

Additionally, as will be described in greater detail below, the dome 104, the outer vortex chamber wall 106, or both define a plurality of outer openings 152 in airflow communication with the outer channel 142 for providing the airflow to the outer channel 142. More particularly, for the embodiment depicted, the outer channel 142 defines an outlet 154 and each of the plurality of outer openings 152 defined by the dome 104, the outer trapped vortex chamber 118, or both are directly in airflow communication with the outer channel 142 at a location upstream of the outlet 154 of the outer channel 142.

It should be appreciated, that the airflow provided to and through the outer channel 142 is a substantial portion of a total amount of airflow provided to the outer trapped vortex chamber 118 during operation, and thus may be considered a driver airflow (i.e., driving the vortex of air, described below). However, as is depicted in FIG. 3, the trapped vortex combustor 100 further includes additional airflow sources for the outer trapped vortex chamber 118. For example, the outer vortex chamber wall 106 further includes a second airflow source 156 at the aft end 112 of the outer vortex chamber wall 106, the outer transition wall 122 includes a third airflow source 158 at an inner end of the outer transition wall 122, and the dome 104 includes a fourth airflow source 160 inward of the outer fuel nozzle opening 134 along the radial direction R. For the embodiment depicted, the second airflow source 156 is similarly configured as a channel configured to receive an airflow through an opening 162 defined by the outer vortex chamber wall 106 at the aft end 112 of the outer vortex chamber wall 106 leading to the channel. Similarly, the third airflow source 158 is also configured as a channel configured receive an airflow through an opening 164 defined by the outer transition wall 122 at the radially inner end of the outer transition wall 122 leading to the channel By contrast, however, the fourth airflow source 160 is simply configured as an opening in the dome 104.

Accordingly, it will be appreciated that during operation of the trapped vortex combustor 100, the airflow provided through the plurality of airflow sources (the airflow generally labeled as numeral 165), also referred to air driver jets, discussed below, generates a trapped vortex of air and fuel mixture 166, ignited to generate the combustion gases 66. Additionally, during operation of the trapped vortex combustor 100, the outer trapped vortex chamber 118 is configured receive a total amount of airflow from all of the plurality of airflow sources combined. As stated, the airflow provided to and through the outer channel 142, however, is a substantial portion of the total amount of airflow provided to the outer trapped vortex chamber 118 during operation. For example, in certain exemplary embodiments, at least about fifteen percent of the total amount of airflow is provided through the outer channel 142, such as at least about twenty percent, such as at least about twenty-five percent, such as up to about forty percent.

Moreover, as is also depicted in FIG. 3 the outer channel 142 further defines a maximum height 168 at a location upstream of the outlet 154 of the outer channel 142. The maximum height 168 is defined in a direction parallel to a forward wall of the dome 104 in the plane depicted in FIG. 3 (i.e., a plane defined by the axial direction A and the radial direction R). Further, the outer fuel nozzle opening 134 defines a separation 170 from the inner surface 146 of the outer vortex chamber wall 106 (i.e., a minimum separation). The separation 170 is similarly defined in a direction parallel to the forward wall of the dome 104 in the plane depicted in FIG. 3. As will be appreciated, providing driver airflow through the outer channel 142 allows for the outer fuel nozzle opening 134 to be moved outwardly generally along the radial direction R. More specifically, by sizing the outer channel 142 to provide a desired amount of airflow allows for all of a forward driver airflow provided to the outer trapped vortex chamber 118 at a radially outer and forward zone to be provided through the outer channel 142, allowing for the separation 170 to be reduced, i.e., allowing the outer fuel nozzle 138 to be moved outward along the radial direction R. Such may lead to an increase in efficiency of the trapped vortex combustor 100. Accordingly, as is depicted, all openings (which may be no openings in some embodiments) in the dome 104 outward of the outer fuel nozzle opening 134 along the radial direction R are in airflow communication with the outer channel 142, with the exception of potential effusion cooling holes. Any of these effusion cooling holes, if included, would have a diameter less than about 0.035 inches, such as less than about 0.030 inches, such that they would be unable to substantially contribute to the forward driver airflow provided through the outer channel 142.

Further, referring back briefly to FIG. 2, it will be appreciated that the trapped vortex combustor 100 defines a cavity height 172 between the outer vortex chamber wall 106 at the outlet 154 of the outer channel 142 and the inner vortex chamber wall 108 at an outlet of the inner channel 144. For the embodiment depicted, the maximum height 168 of the outer channel 142 is between about 0.1 percent and about eight percent of the cavity height 172, and further, the separation 170 of the outer fuel nozzle opening 134 with the inner surface 146 of the outer vortex chamber wall 106 is between about one percent and about eight percent of the cavity height 172. For example, in certain exemplary embodiments, the maximum height 168 of the outer channel 142 may be at least about 0.2 percent of the cavity height 172, such as at least about 0.3 percent of the cavity height 172, such as at least about two percent of the cavity height 172, such as up to about seven percent of the cavity height 172, such as up to about six percent of the cavity height 172.

Notably, it should be appreciated that for the embodiment depicted, the inner trapped vortex chamber 120 is configured in substantially the same manner as the outer trapped vortex chamber 118, only mirrored. For example, for the embodiment depicted, the inner trapped vortex chamber 120 also includes a second airflow source 174, a third airflow source 176, and a fourth airflow source 178. Additionally, the inner channel 144 may be configured to provide at least about fifteen percent of a total amount of airflow to the inner trapped vortex chamber 120 during operation, such as at least about twenty percent, such as at least about twenty-five percent, such as up to about forty percent. Further, the inner channel 144 may have similar dimensions as the outer channel 142 (e.g., the maximum height), and the inner fuel nozzle opening 136 may define a similar separation with the inner surface 148 of the inner vortex chamber wall 108. Moreover, as will be discussed in greater detail below, the dome 104, the inner vortex chamber wall 108, or both define a plurality of inner openings 180 in airflow communication with the inner channel 144 for providing the airflow to the inner channel 144.

Figure 4:
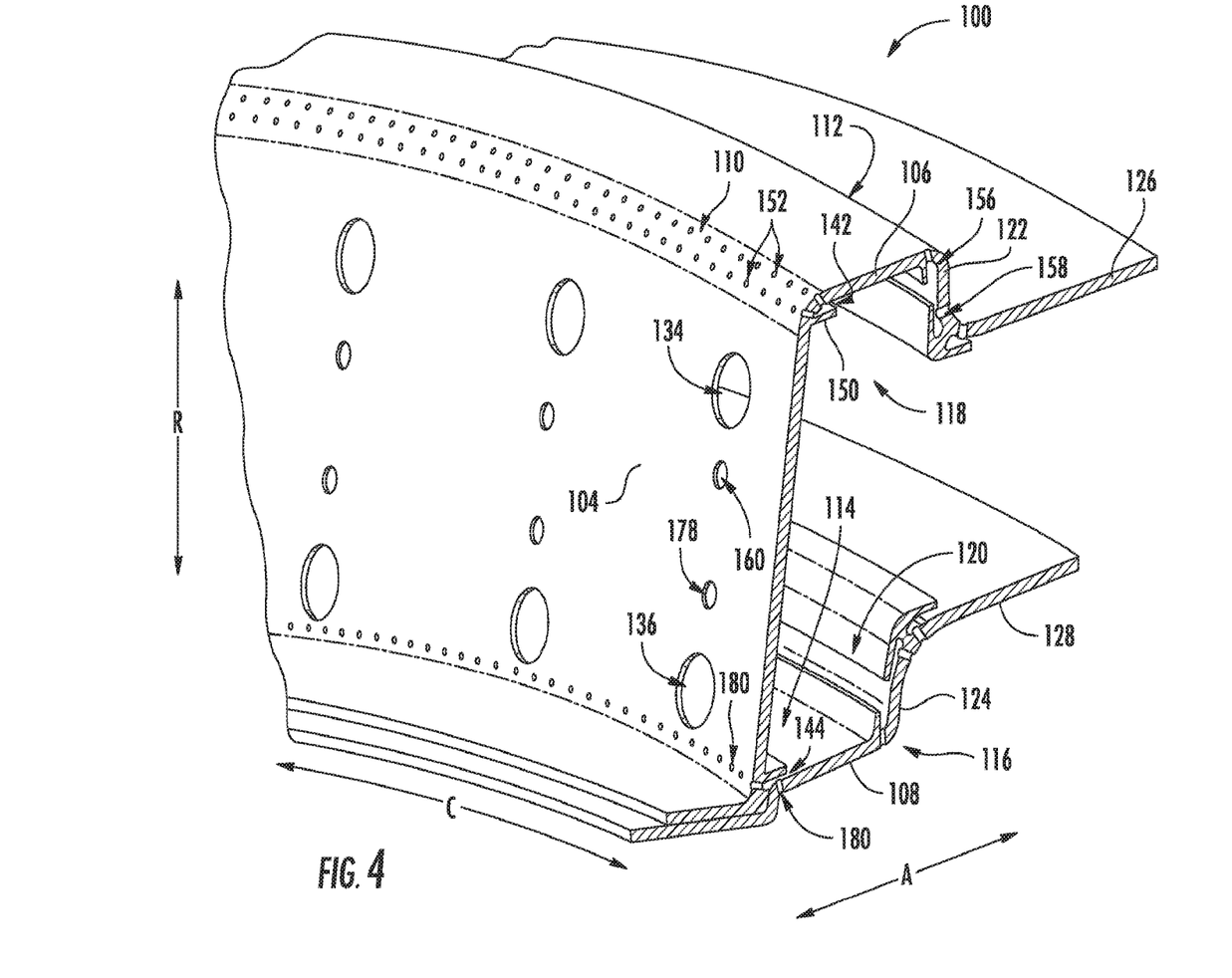
FIG. 4 is a perspective view of a section of the exemplary combustor assembly of FIG. 2.

Referring now also to FIG. 4, a perspective, cross-sectional view of a forward end 110 of the exemplary trapped vortex combustor 100 of FIGS. 2 and 3 is provided. As briefly stated above, the dome 104, the outer vortex chamber wall 106, or both define a plurality of outer openings 152 in airflow communication with the outer channel 142 for providing the airflow to the outer channel 142. Additionally, the dome 104, the inner vortex chamber wall 108, or both define a plurality of inner openings 180 in airflow communication with the inner channel 144 for providing airflow to the inner channel 144. For the embodiment depicted, both the dome 104 and the outer vortex chamber wall 106 define the plurality of outer openings 152, and similarly both the dome 104 and the inner vortex chamber wall 108 define the plurality of inner openings 180. Additionally, the plurality of outer openings 152 are spaced substantially evenly along the circumferential direction C of the trapped vortex combustor 100, and the plurality of inner openings 180 are similarly spaced substantially evenly along the circumferential direction C of the trapped vortex combustor 100. However, in other exemplary embodiments, the plurality of outer openings 152 and/or the plurality of inner openings 180 may instead define any other suitable spacing.

Notably, it will further be appreciated that in addition to the outer fuel nozzle opening 134 and inner fuel nozzle opening 136 described above with reference to FIG. 2, the dome 104 further defines a plurality of outer fuel nozzle openings 134 spaced substantially evenly along the circumferential direction C, as well as a plurality of inner fuel nozzle openings 136 spaced substantially evenly along the circumferential direction C. Each of the outer fuel nozzle openings 134 may be configured to receive a respective outer fuel nozzle 138 of the fuel nozzle assembly 132 and each of the inner fuel nozzle openings 136 may be configured to receive a respective inner fuel nozzle 140 of the fuel nozzle assembly 132.

Moreover, it will be appreciated that for the embodiment depicted, the outer channel 142 extends substantially continuously three hundred sixty degrees about the axial centerline 102 of the trapped vortex combustor 100 and similarly, the inner channel 144 also extends substantially continuously three hundred sixty degrees about the axial centerline 102 of the trapped vortex combustor 100. For example, referring briefly to FIG. 5, a simplified, schematic view of a forward end of the exemplary trapped vortex combustor 100 of FIGS. 2 through 4 is provided. As is depicted schematically, and in phantom, the outer channel 142 extends substantially continuously three hundred sixty degrees about the axial centerline 102 of the trapped vortex combustor 100 and similarly, the inner channel 144 also extends substantially continuously the inner and 60 degrees about the axial centerline 102 of the trapped vortex combustor 100. Notably, as used herein, extending "substantially continuously" with reference to one or both of the outer channel 142 or inner channel 144 refers the respective channel extending along the circumferential direction C with less than ten percent of an entire annular volume being blocked by, e.g., connection walls, struts, etc. For example, although the dome 104 and outer vortex chamber wall 106 are depicted as each being single, monolithic components extending continuous three hundred and sixty degrees about the axial centerline 102, in other embodiments, one or both of these components may be formed of separate components joined in any suitable manner (e.g., may include attachment members that block small portions of one or both of the outer or inner channels 142, 144, such as less than ten percent by total annular volume of the respective channel).

Referring back to FIG. 4, as briefly stated above, providing the above disclosed amounts of airflow through the outer channel 142 may allow for moving the outer fuel nozzle openings 134 outwardly generally along the radial direction R as no other airflow nozzles are required in the dome 104 to provide sufficient driver airflow. Accordingly, all the openings in the dome 104 outward of the outer fuel nozzle opening 134 along the radial direction R are in airflow communication with the outer channel 142 (with the potential exception of effusion cooling holes less than about 0.035 inches in diameter, as discussed above). Similarly, all the openings in the dome 104 inward of the inner fuel nozzle opening 136 along the radial direction R are in airflow communication with the inner channel 144 (with the potential exception of effusion cooling holes less than about 0.035 inches in diameter, as discussed above). Notably, although at least certain of the plurality of outer openings 152 in airflow communication with the outer channel 142 are defined in the dome 104 and in the outer vortex chamber wall 106 for the embodiment depicted, in other exemplary embodiments, all of the plurality of outer openings 152 in airflow communication with the outer channel 142 may instead be defined solely in the dome 104, or solely in the outer vortex chamber wall 106. Further, although at least certain of the plurality of inner openings 180 in airflow communication with the inner channel 144 are defined in the dome 104 and in the inner vortex chamber wall 108 for the embodiment depicted, in other exemplary embodiments, all of the plurality of inner openings 180 in airflow communication with the inner channel 144 may instead be defined solely in the dome 104, or solely in the inner vortex chamber wall 108. Accordingly, as used herein, "all the openings in the dome 104", either outward of the outer fuel nozzle opening 134 or inward of the inner fuel nozzle opening 136, may refer to zero openings in the dome 104.

It should be appreciated, however, that in other exemplary embodiments, the trapped vortex combustor 100 may instead have any other suitable configuration. For example, in other exemplary embodiments of the present disclosure, the trapped vortex combustor 100 may not define both the inner trapped vortex chamber 120 and outer trapped vortex chamber 118. More specifically, in at least certain exemplary embodiments, the trapped vortex combustor 100 may not define the inner trapped vortex chamber 120 and, instead, may only define outer trapped vortex chamber 118. With such an exemplary embodiment, as discussed above, the outer fuel nozzle 138 may be positioned in an opening 134 in the dome 104, as shown, or alternatively may be positioned in an opening in the outer trapped vortex chamber wall 106.

Additionally, in still other exemplary embodiments, one or both of the inner channel 144 and outer channel 142 may have any other suitable configuration. For example, referring briefly to FIG. 6, a trapped vortex combustor 100 in accordance with another exemplary embodiment of the present disclosure is depicted. The exemplary trapped vortex combustor 100 of FIG. 6 may be configured in substantially the same manner as exemplary trapped vortex combustor 100 described above with FIGS. 2 through 5. For example, the exemplary trapped vortex combustor 100 of FIG. 6 generally includes an outer vortex chamber wall 106, a dome 104, and an inner vortex chamber wall 108. The dome 104 is attached to, or rather formed integrally with, the outer vortex chamber wall 106 to define at least in part an outer trapped vortex chamber 118 and an outer channel 142. Similarly, the dome 104 is attached to, or rather formed integrally with, the inner vortex chamber wall 108 to define at least in part an inner trapped vortex chamber 120 and an inner channel 144. The dome 104 further defines an outer fuel nozzle opening 134 and an inner fuel nozzle opening 136, with all openings in the dome 104 outward of the outer fuel nozzle opening 134 along the radial direction R being in airflow communication with the outer channel 142 and all openings in the dome 104 inward of the inner fuel nozzle opening 136 along the radial direction R being in airflow communication with the inner channel 144.

Figure 6:
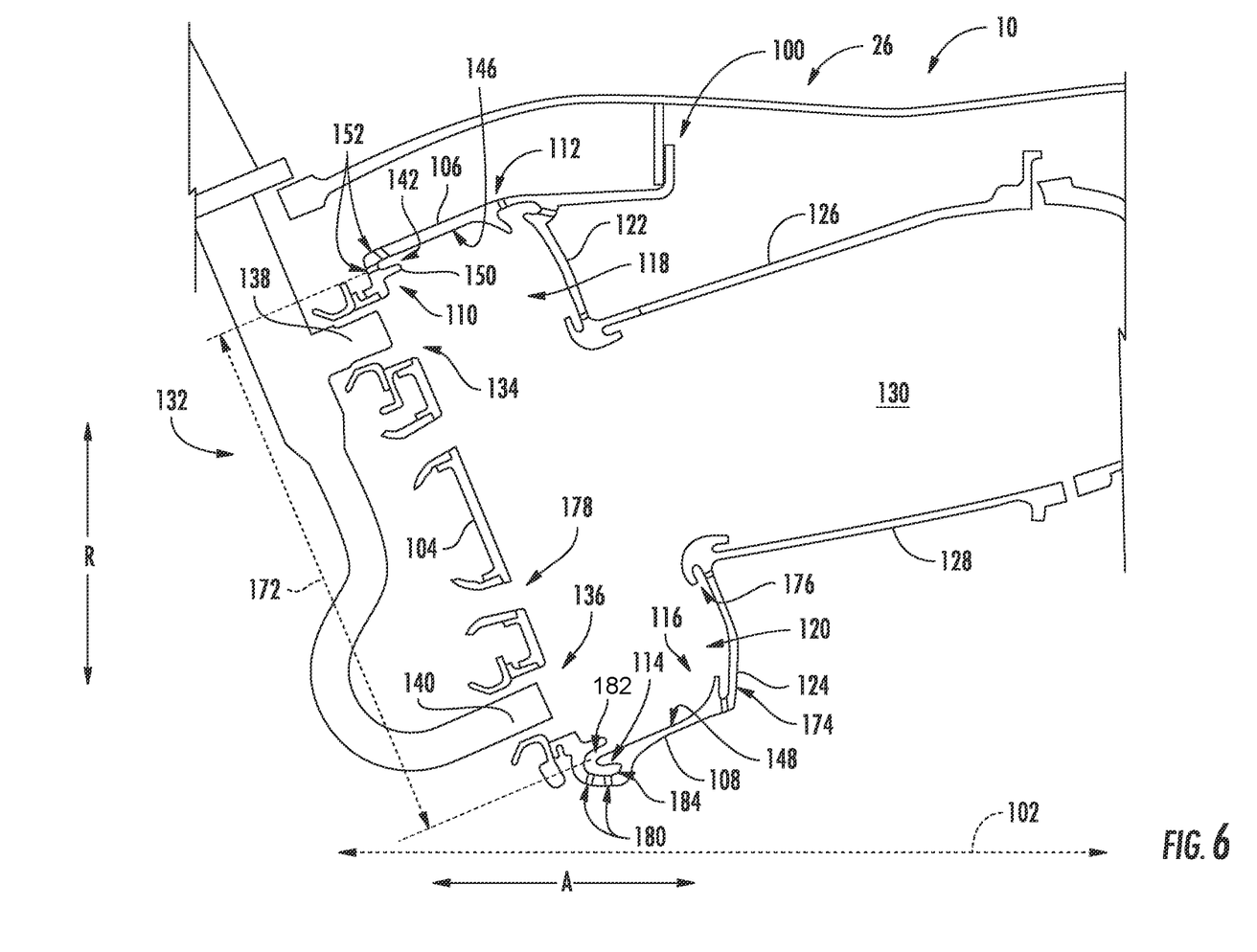
FIG. 6 is a side, schematic, cross-sectional view of a combustor assembly in accordance with another exemplary embodiment of the present disclosure.

However, referring particularly to the inner channel 144 defined by one or both of the dome 104 and the inner vortex chamber wall 108, the inner channel 144 is split between an injection section 182 and a mixing section 184. The plurality of openings in at least one of the dome 104 and the inner vortex chamber wall 108 are in airflow communication with the mixing section 184 of the inner channel 144 to provide a substantially annular airflow to the injection section 182, such that the inner channel 144 may provide a more annular airflow to the inner trapped vortex chamber 120 during operation.

Notably, although only the inner channel 144 is configured with a separate injection section 182 and mixing section 184, in other exemplary embodiments, the outer channel 142 may additionally be configured in such a manner, or alternatively be configured in such a manner. Further, in still other embodiments, one or both of the outer channel 142 or inner channel 144 may have any other suitable geometry.

Additionally, or alternatively, in still other exemplary embodiments, the trapped vortex combustor 100 may have any other suitable configuration. For example, instead of airflow flowing through outer openings 152 defined in one or both of the dome 104 or the outer vortex chamber wall 106 to the outer channel 142, or through inner openings 180 defined in one or both of the dome 104 or the inner vortex chamber wall 108 to the inner channel 144, airflow may instead flow around one or more these components. For example, referring now to FIG. 7, a close-up, cross-sectional view of an outer section of a trapped vortex combustor 100 in accordance with another exemplary embodiment of the present disclosure is provided. The exemplary trapped vortex combustor 100 of FIG. 7 may be configured in substantially the same manner as the exemplary trapped vortex combustor 100 described above with reference to FIGS. 1 through 5. For example, the exemplary trapped vortex combustor 100 of FIG. 7 generally includes an outer vortex chamber wall 106 and a dome 104, with the dome 104 attached to the outer vortex chamber wall 106. Additionally, the outer vortex chamber wall 106 and the dome 104 together define at least in part an outer trapped vortex chamber 118 and an outer channel 142.

Figure 7:
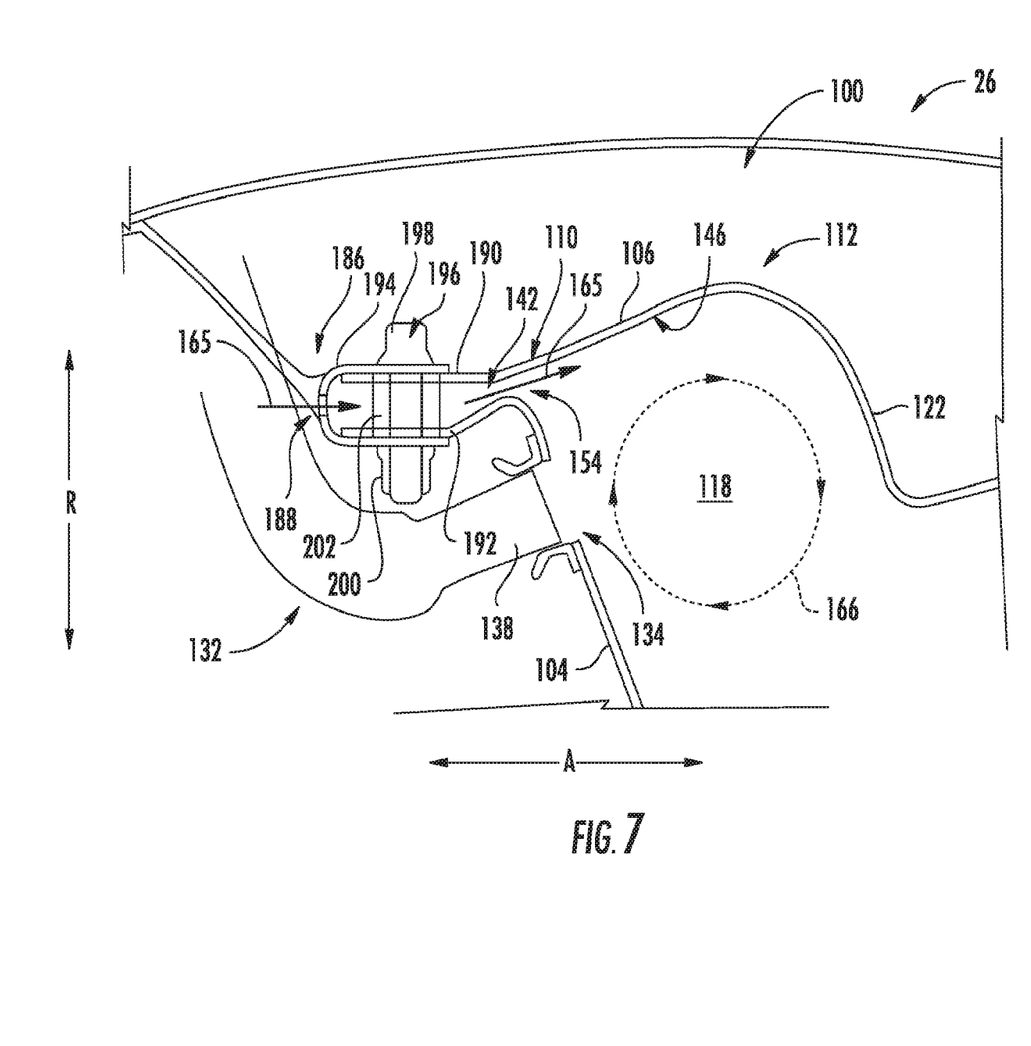
FIG. 7 is a side, schematic, cross-sectional view of a combustor assembly in accordance with yet another exemplary embodiment of the present disclosure.

However, for the embodiment of FIG. 7, neither the dome 104 nor the outer vortex chamber wall 106 define a plurality of outer openings 152 (see above embodiments) in airflow communication with the outer channel 142. Instead, the trapped vortex combustor 100 further includes a mount 186, with the mount 186 defining a plurality of openings 188 in airflow communication with the outer channel 142. More particularly, for the embodiment depicted the outer vortex chamber wall 106 includes a wall flange 190 at a forward end 110 of the outer vortex chamber wall 106 and the dome 104 includes a dome flange 192 at a radially outer end of the dome 104. The mount 186 includes a C-shaped flange 194 extending around the wall flange 190 and the dome flange 192. The plurality of openings 188 of the mount 186 are defined in a forward end of the C-shaped flange 194 to provide an airflow around the dome 104 and outer vortex chamber wall 106 and to the outer channel 142 defined between the wall flange 190 and dome flange 192. The outer channel 142 may then provide such airflow as a continuous annular airflow to the inner surface 146 of the outer vortex chamber wall 106 during operation. It should be appreciated, however, that in other exemplary embodiments, air may flow through openings defined in one or more of the flange 194 of the mount 186, the wall flange 190, and/or the dome flange 192. Such air may then be provided to the channel 142 defined by the outer vortex chamber wall 106 and dome 104 (such components essentially forming a gap therebetween).

Notably, referring still to FIG. 7, an attachment assembly 196 is provided to attach the C-shaped flange 194 to the dome flange 192 and the wall flange 190, connecting the dome 104 to the outer vortex chamber wall 106. More particularly, the attachment assembly 196 includes a bolt 198, a nut 200, and a spacer 202. However, in other exemplary embodiments any other suitable mount 186 and attachment assembly 196 may be provided.

Furthermore, it will be appreciated that as with the other exemplary embodiments described above, for the embodiment of FIG. 7, all openings in the dome 104 outward of the outer fuel nozzle opening 134 along the radial direction R are in flow communication with the outer channel 142. More specifically, for the exemplary embodiment depicted, the dome 104 does not include any openings outward of the outer fuel nozzle opening 134 along the radial direction R.

Additionally, although not depicted, it should be appreciated that in other exemplary embodiments, the inner channel 144 may additionally, or alternatively, be configured in substantially the same manner as exemplary outer channel 142 described herein with reference to FIG. 7.

Figure 8:
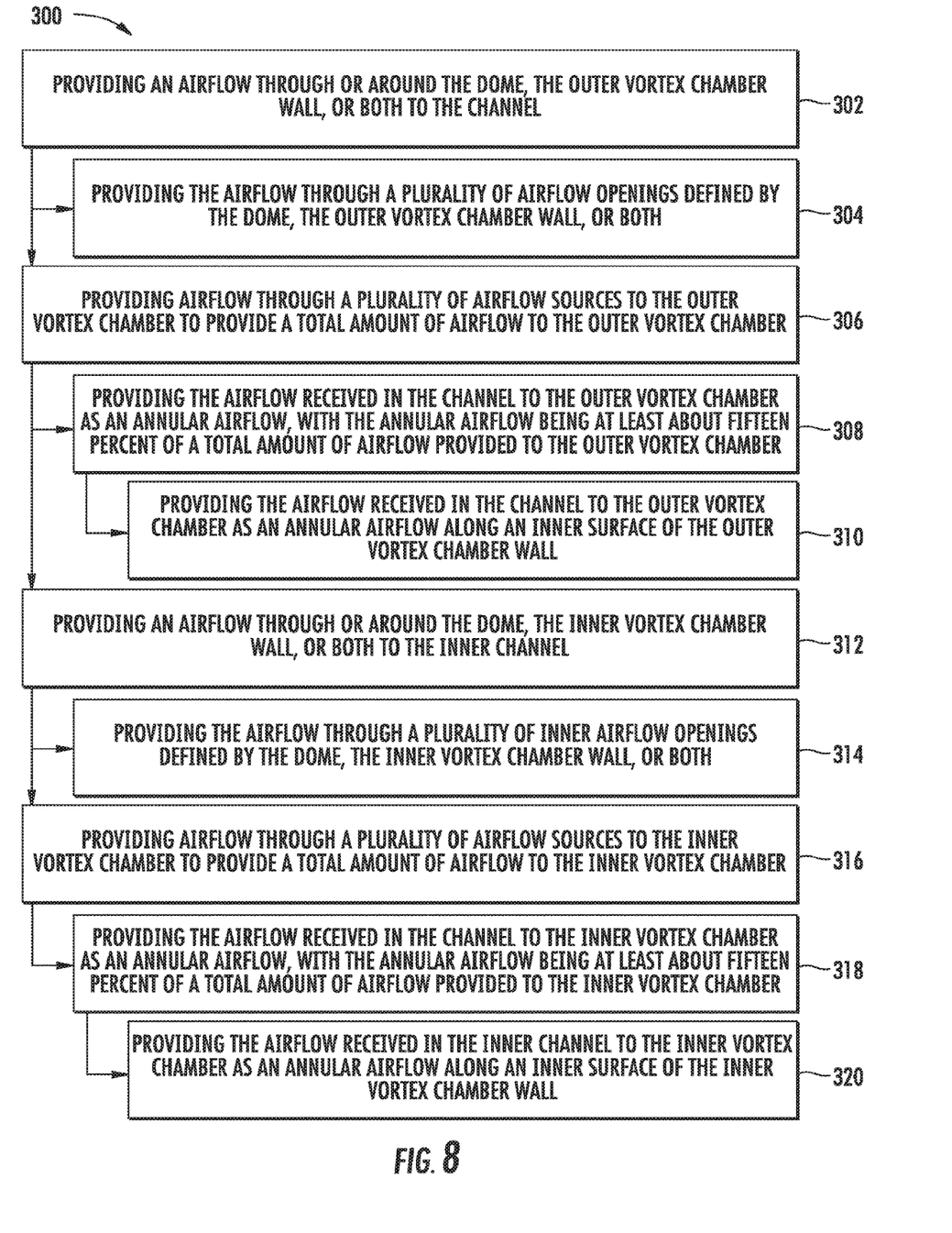
FIG. 8 is a flow diagram of a method of operating a trapped vortex combustor of a gas turbine engine in accordance with an exemplary embodiment of the present disclosure.

Referring now to FIG. 8, a flow diagram of a method 300 for operating a trapped vortex combustor of a gas turbine engine is provided. The trapped vortex combustor may be configured in a same or similar manner as one or more the exemplary trapped vortex combustors described above with reference to FIGS. 1 through 7. Accordingly, for example, the trapped vortex combustor may include an outer vortex chamber wall and a dome attached to, or formed integrally with, the outer vortex chamber wall. The dome, the outer vortex chamber wall, or both define at least in part an outer trapped vortex chamber and a channel. The channel may be positioned at a forward end of the outer vortex chamber wall.

The method 300 includes at (302) providing an airflow through or around the dome, the outer vortex chamber wall, or both to the channel. Further, for the exemplary method 300 depicted, providing the airflow through or around the dome, the outer vortex chamber wall, or both to the channel at (302) additionally includes at (304) providing the airflow through a plurality of airflow openings defined by the dome, the outer vortex chamber wall, or both.

Additionally the method 300 includes at (306) providing airflow through a plurality of airflow sources to the outer vortex chamber to provide a total amount of airflow to the outer vortex chamber. More specifically, for the exemplary aspect depicted, providing airflow through the plurality of airflow sources to the outer vortex chamber at (306) includes at (308) providing the airflow received in the channel at (302) to the outer vortex chamber as an annular airflow, with the annular airflow being at least about fifteen percent of a total amount of airflow provided to the outer vortex chamber.

Moreover, providing the airflow received in the channel at (302) to the outer vortex chamber as the annual airflow at (308) additionally includes at (310) providing the airflow received in the channel to the outer vortex chamber as an annular airflow along an inner surface of the outer vortex chamber wall.

Furthermore, for the exemplary aspect of FIG. 8, it will be appreciated that the channel is an outer channel, that the combustor further includes an inner vortex chamber wall, with the dome being attached to, or formed integrally with the inner vortex chamber wall. Additionally, the dome, the inner vortex chamber wall, or both define at least in part an inner trapped vortex chamber and an inner channel positioned at a forward end of the inner vortex chamber wall.

Moreover, with such an exemplary aspect, the method 300 further includes at (312) providing an airflow through or around the dome, the inner vortex chamber wall, or both to the inner channel. Further, for the exemplary method 300 depicted, providing the airflow through or around the dome, the inner vortex chamber wall, or both to the channel at (312) additionally includes at (314) providing the airflow through a plurality of inner airflow openings defined by the dome, the inner vortex chamber wall, or both.

Additionally the method 300 includes at (316) providing airflow through a plurality of airflow sources to the inner vortex chamber to provide a total amount of airflow to the inner vortex chamber. More specifically, for the exemplary aspect depicted, providing airflow through the plurality of airflow sources to the inner vortex chamber at (316) includes at (318) providing the airflow received in the inner channel at (312) to the inner vortex chamber as an annular airflow, with the annular airflow being at least about fifteen percent of a total amount of airflow provided to the inner vortex chamber.

Moreover, providing the airflow received in the inner channel at (312) to the inner vortex chamber as the annual airflow at (318) additionally includes at (320) providing the airflow received in the inner channel to the inner vortex chamber as an annular airflow along an inner surface of the inner vortex chamber wall.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A trapped vortex combustor for use in a gas turbine engine, the trapped vortex combustor defining a radial direction and a circumferential direction, the trapped vortex combustor comprising:

an outer vortex chamber wall having an inner surface on a combustion chamber side of the outer vortex chamber wall, and including an outer vortex chamber wall flange arranged at a forward end of the outer vortex chamber wall;

a dome having an outer dome flange; and a mount attaching the outer dome flange to the outer vortex chamber wall flange, a channel defined between the outer dome flange and the outer vortex chamber wall flange, wherein the dome, the outer vortex chamber wall, or both define at least in part an outer trapped vortex chamber, the channel extending along the circumferential direction at the mount between the outer dome flange and the outer vortex chamber wall flange and configured to receive an airflow, the mount including a plurality of openings in airflow communication with the channel for providing the airflow as a continuous annular airflow to the inner surface of the outer vortex chamber wall, wherein the dome further defines a fuel nozzle opening, with all openings in the dome outward of the fuel nozzle opening along the radial direction, excepting any effusion cooling holes having a diameter less than about 0.035 inches, being in airflow communication with the channel, wherein the mount further comprises a C-shaped flange extending around the outer vortex chamber wall flange and the outer dome flange, and wherein the plurality of openings of the mount are defined in a forward end of the C-shaped flange to provide the airflow to the channel defined between the outer vortex chamber wall flange and the outer dome flange.

2. The trapped vortex combustor of claim 1, further comprising:

an inner combustion chamber liner and an outer combustion chamber liner together defining a combustion chamber, wherein the outer trapped vortex chamber is positioned upstream of the combustion chamber.

3. The trapped vortex combustor of claim 1, wherein the plurality of openings are spaced along the circumferential direction.

4. The trapped vortex combustor of claim 1, wherein the outer trapped vortex chamber is configured to receive a total amount of airflow during operation, and wherein at least about fifteen percent of the total amount of airflow is provided through the channel.

5. The trapped vortex combustor of claim 1, wherein the channel extends three hundred and sixty degrees about an axial centerline of the trapped vortex combustor.

6. The trapped vortex combustor of claim 1, wherein the channel is an outer channel, and wherein the dome further comprises an inner dome flange, and the combustor further comprises:
- an inner vortex chamber wall having an inner surface on a combustion chamber side of the inner vortex chamber wall and including an inner vortex chamber wall flange arranged at a forward end of the inner vortex chamber wall; and
- an inner mount attaching the inner dome flange to the inner vortex chamber wall flange, an inner channel defined between the inner dome flange and the inner vortex chamber wall flange,
- wherein the dome, the inner vortex chamber wall, or both define at least in part an inner trapped vortex chamber, the inner channel extending along the circumferential direction at the inner mount between the inner dome flange and the inner vortex chamber wall flange and configured to receive an airflow, the inner mount defining a plurality of openings in airflow communication with the inner channel for providing the airflow as a continuous annular airflow to the inner surface of the inner vortex chamber wall.

7. The trapped vortex combustor of claim 6, wherein the fuel nozzle opening of the dome is an outer fuel nozzle opening, wherein the dome further defines an inner fuel nozzle opening, and wherein all openings in the dome inward of the inner fuel nozzle opening along the radial direction, excepting any effusion cooling holes having a diameter less than about 0.035 inches, are in airflow communication with the inner channel.

8. The trapped vortex combustor of claim 6, wherein the inner channel extends three hundred and sixty degrees about an axial centerline of the trapped vortex combustor.

9. The trapped vortex combustor of claim 6, wherein the outer channel defines an outer channel outlet and the inner channel defines an inner channel outlet,
- wherein the trapped vortex combustor defines a cavity height between the outer vortex chamber wall at the outer channel outlet and the inner vortex chamber wall at the inner channel outlet, wherein the outer channel further defines a maximum height, and wherein the maximum height of the outer channel is between about 0.1 percent and about eight percent of the cavity height.

10. The trapped vortex combustor of claim 6, wherein the outer channel defines an outer channel outlet and the inner channel defines an inner channel outlet,
- wherein the trapped vortex combustor defines a cavity height between the outer vortex chamber wall at the outer channel outlet and the inner vortex chamber wall at the inner channel outlet, wherein the fuel nozzle opening defines a separation from the inner surface of the outer vortex chamber wall, and wherein the separation is between about one percent and about eight percent of the cavity height.

11. The trapped vortex combustor of claim 1, wherein the channel is an outer channel, and wherein the trapped vortex combustor further comprises:
- an inner vortex chamber, comprising:
  - an inner vortex chamber wall extending axially from a forward end to an aft end,
  - wherein the dome extends radially outward from the forward end of the inner vortex chamber wall,
  - wherein an inner annular lip extends axially aft from the dome to define, at least in part, an inner annular channel between the inner annular lip and the forward end of the inner vortex chamber wall.

12. The trapped vortex combustor according to claim 11, wherein the outer channel defines an outlet, and the inner annular channel defines an outlet,
- wherein the trapped vortex combustor defines a cavity height between the outer vortex chamber wall at the outlet of the outer channel and the inner vortex chamber wall at the outlet of the inner annular channel.

13. The trapped vortex combustor according to claim 11, wherein the inner vortex chamber further comprises an inner transition wall extending radially outward from an aft end of the inner vortex chamber wall, the inner transition wall including an second annular wall extension extending from a radially outer end of the inner transition wall.

14. The trapped vortex combustor according to claim 13, wherein the inner transition wall comprises an inner transition wall opening that directly faces the second annular wall extension.

15. The trapped vortex combustor according to claim 14, wherein an inner transition wall airflow through the inner transition wall opening is redirected by the second annular wall extension in the radial direction toward the inner vortex chamber wall.

\* \* \* \* \*